US012614650B2

(12) United States Patent
Moriyama et al.

(10) Patent No.: US 12,614,650 B2
(45) Date of Patent: Apr. 28, 2026

(54) COMPOSITE CABLE

(71) Applicant: Proterial, Ltd., Tokyo (JP)

(72) Inventors: Masashi Moriyama, Tokyo (JP); Detian Huang, Tokyo (JP); Masanori Kobayashi, Tokyo (JP); Atsuro Yaguchi, Tokyo (JP); Kimika Kudo, Tokyo (JP)

(73) Assignee: Proterial, Ltd., Tokyo (JP)

( * ) Notice: Subject to any disclaimer, the term of this patent is extended or adjusted under 35 U.S.C. 154(b) by 84 days.

(21) Appl. No.: 18/244,056

(22) Filed: Sep. 8, 2023

(65) Prior Publication Data

US 2024/0170183 A1 May 23, 2024

(30) Foreign Application Priority Data

Nov. 17, 2022 (JP) ................................ 2022-184253

(51) Int. Cl.

*H01B 11/02* (2006.01)
*H01B 7/18* (2006.01)
*H01B 9/00* (2006.01)
*H01B 3/30* (2006.01)

(52) U.S. Cl.

CPC ............... *H01B 9/003* (2013.01); *H01B 7/18* (2013.01); *H01B 11/02* (2013.01); *H01B 3/30* (2013.01)

(58) Field of Classification Search

CPC . H01B 1/02; H01B 3/30; H01B 3/306; H01B 3/44; H01B 7/0045; H01B 7/02–7/18; H01B 7/22; H01B 7/226; H01B 7/28; H01B 7/282; H01B 7/34; H01B 9/003–9/006; H01B 9/02; H01B 11/02–11/18; H01B 11/1808; H01B 11/20; H01R 4/60; H01R 4/62; H01R 4/70; H02G 15/18; H02G 18/188

USPC .......................................... 174/102 R–120 R

See application file for complete search history.

(56) References Cited

U.S. PATENT DOCUMENTS 3,614,300 A * 10/1971 Wilson .................. H01B 7/182
174/115
3,802,301 A * 4/1974 Peterson .............. B25B 23/145
81/468
4,358,636 A * 11/1982 Ijff ......................... H01B 11/20
174/34

(Continued)

FOREIGN PATENT DOCUMENTS

JP S61-171010 A 8/1986
JP 2015-138751 A 7/2015

OTHER PUBLICATIONS

Japanese Office Action dated Feb. 3, 2026 in Japanese Patent Application No. 2022-184253 with English translation.

*Primary Examiner* — William H. Mayo, III
(74) *Attorney, Agent, or Firm* — McGinn IP Law Group, PLLC

(57) ABSTRACT

A composite cable having an outer diameter of 1.0 mm or less is provided with a cable core including multiple signal lines, a power line with an outer diameter smaller than an outer diameter of the signal line, and a drain wire with an outer diameter smaller than the outer diameter of the power line, and a sheath covering around the cable core. An outermost layer of the signal line is a shield layer, and either one of the power line or the drain wire is arranged in each valley-like space between the multiple signal lines arranged in contact with one another inside the cable core.

20 Claims, 2 Drawing Sheets

(56) References Cited

U.S. PATENT DOCUMENTS

| | | | | |
|---|---|---|---|---|
| 7,304,241 | B2 * | 12/2007 | Trieb | H01R 13/65912 174/81 |
| 7,351,912 | B2 * | 4/2008 | Lund | A61B 5/321 174/113 R |
| 7,595,647 | B2 * | 9/2009 | Kroh | H01B 11/20 174/115 |
| 9,508,467 | B2 * | 11/2016 | Pon | H01B 9/003 |
| 10,002,689 | B2 * | 6/2018 | Straniero | H01B 9/028 |
| 10,672,538 | B2 * | 6/2020 | Kobayashi | H01B 9/02 |
| 11,373,783 | B1 * | 6/2022 | McNutt | H01B 7/28 |
| 11,538,606 | B1 * | 12/2022 | Bigbee, Jr. | H01B 7/365 |
| 11,735,337 | B2 * | 8/2023 | Lee | H01B 11/002 174/115 |
| 2002/0066503 | A1 * | 6/2002 | Matsui | C22F 1/08 148/432 |
| 2003/0121694 | A1 * | 7/2003 | Grogl | H01B 3/441 174/113 R |
| 2004/0040736 | A1 * | 3/2004 | Nishimura | H01B 11/10 174/113 R |
| 2010/0051318 | A1 * | 3/2010 | Wang | H01B 11/12 174/113 R |
| 2010/0084157 | A1 * | 4/2010 | Wang | H01B 11/12 174/107 |
| 2011/0200289 | A1 * | 8/2011 | Sorimachi | H01B 7/041 385/101 |
| 2011/0220389 | A1 * | 9/2011 | Huang | H01B 11/203 174/113 R |
| 2015/0096785 | A1 * | 4/2015 | Hayashishita | H01B 11/20 174/113 R |
| 2015/0200040 | A1 * | 7/2015 | Pon | H01B 11/00 174/103 |
| 2016/0020002 | A1 * | 1/2016 | Feng | H01B 11/20 174/103 |
| 2016/0353617 | A1 * | 12/2016 | Gimblet | G02B 6/4416 |
| 2017/0025203 | A1 * | 1/2017 | Chen | H01B 11/20 |
| 2017/0110221 | A1 * | 4/2017 | Wu | H01B 11/08 |
| 2019/0074110 | A1 * | 3/2019 | Niwata | H01B 3/306 |
| 2022/0246326 | A1 * | 8/2022 | Yaguchi | H01B 7/0208 |
| 2022/0254549 | A1 * | 8/2022 | Tsukahara | H01B 11/20 |
| 2023/0102030 | A1 * | 3/2023 | Yaguchi | H01B 11/02 174/113 R |
| 2023/0108586 | A1 * | 4/2023 | Yaguchi | A61B 1/00114 174/107 |

* cited by examiner

COMPOSITE CABLE

CROSS-REFERENCE TO RELATED APPLICATIONS

The present patent application claims the priority of Japanese patent application No. 2022-184253 filed on Nov. 17, 2022, and the entire contents thereof are hereby incorporated by reference.

TECHNICAL FIELD

The present invention relates to a composite cable.

BACKGROUND OF THE INVENTION

Conventionally, in the field of robots such as industrial robots, for example, composite cables are used for wiring inside the robots to connect servomotors by way of connectors. In the configuration of well-known types of composite cables, each of the power lines and signal lines is covered by a shield, and these power lines and signal lines are collectively covered by a sheath (See, e.g., Patent Literature 1).

CITATION LIST

Patent Literature Patent Literature 1: JPS61-171010A

SUMMARY OF THE INVENTION

In recent years, robots have become more and more downsized, so the space for wiring cables becomes narrower and narrower. Moreover, the functions and performances of robots are improving, which increases the types and number of cables to be wired inside the robots. Therefore, extremely thin (i.e., super fine) composite cables with an outer diameter of 1.0 mm or less, for example, are required for wiring robots.

The composite cables wired inside a robot are arranged by way of movable parts. Thus, even extremely thin composite cables are required not to be easily broken when they are repeatedly subjected to operations such as bending, twisting, or shaking (hereinafter, referred to as "bending operation or the like").

Therefore, the object of the present invention is to provide an extremely thin composite cable that is not easily broken even when a bending force or the like is repeatedly applied.

The present invention provides a composite cable, with an outer diameter of 1.0 mm or less, comprising:

- a cable core comprising multiple signal lines, a power line with an outer diameter smaller than an outer diameter of the signal line, and a drain wire with an outer diameter smaller than the outer diameter of the power line;
- a sheath covering around the cable core,
- wherein an outermost layer of the signal line is a shield layer, and either one of the power line or the drain wire is arranged in each valley-like space between the multiple signal lines arranged in contact with one another inside the cable core.

Advantageous Effects of the Invention

According to the present invention, it is possible to provide an extremely thin composite cable that is not easily broken even when a bending force or the like is repeatedly applied.

MODE FOR CARRYING OUT THE INVENTION

Embodiment

An embodiment of the present invention will be explained below with reference to the appended drawings.

Figure 1:
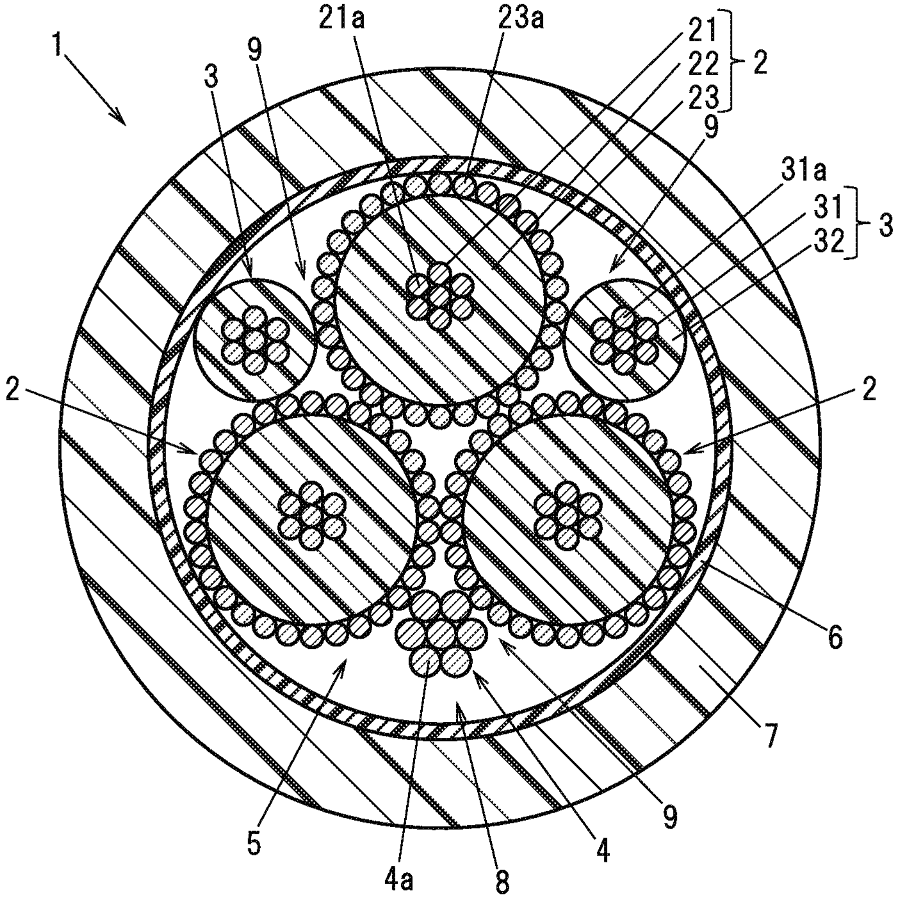
FIG. 1 is a cross-sectional view perpendicular to a longitudinal direction of a composite cable according to an embodiment of the present invention.

FIG. 1 is a cross-sectional view perpendicular to a longitudinal direction of a composite cable 1 according to the present embodiment. The composite cable 1 is, for example, used for wiring inside robots such as small sized industrial robots, and is a cable for a movable part, which is wired via a movable part. Also, the composite cable 1 is an extremely thin (i.e., super fine) cable with an outer diameter of 1.0 mm or less. Additionally, the composite cable 1 according to the present embodiment can be used, for example, as a cable for wiring vehicles and medical equipment or the like in addition to movable parts of robots. As for medical equipment, an endoscope catheter to be inserted into a blood vessel can be listed as an example.

Additionally, the outer diameter of the composite cable 1, signal lines 2, power lines 3, and a drain wire 4 that are described below can be measured respectively by using a caliper, micrometer, or microscope by a test method in compliance with JIS C 3005.

As shown in FIG. 1, the composite cable 1 is composed of a cable core 5 that is configured by twisting together the multiple signal lines 2 for signal transmissions, multiple power lines 3 for power supply, and a drain wire 4 for grounding, a binder tape 6 wrapped around the cable core 5, and a sheath 7 that covers around the binder tape 6.

(Signal Line 2)

The signal line 2 is composed of an inner conductor 21, an insulator 22 that covers around the inner conductor 21, and a shield layer 23 that covers around the insulator 22 and is the outermost layer of the signal line 2. The inner conductor 21 is a stranded conductor configured by concentrically twisting multiple elementary wires (also referred to as "strands" or "wires") 21*a* that are composed of copper alloy wires. Here, as the elementary wires 21*a* of the inner conductor 21, tin-plated copper alloy wires are used. In the present embodiment, the outer diameter of the cable is 1.0 mm or less, which is extremely thin, so the inner conductor 21 should be very thin as well (e.g., the outer diameter is 0.1 mm or less). Therefore, as the elementary wires 21*a* of the inner conductor 21, copper alloy wires with high strength need to be used to improve resistance (in other words, make them hard to break) when a bending operation or the like is repeatedly applied. In concrete terms, as the elementary wires 21*a* for the inner conductor 21, it is desirable to use copper alloy wires with a tensile strength of 800 MPa or more. As copper alloy wires with a tensile strength of 800 MPa or more, copper alloy wires made of Cu—Sn—In alloy containing tin (Sn) and indium (In) and the balance being copper (Cu) and unavoidable impurities, Cu—In alloy containing indium (In) and the balance being copper (Cu) and unavoidable impurities, and Cu—Ag alloy containing silver (Ag) the balance being copper (Cu) and unavoidable impurities, can be listed as examples.

In the present embodiment, three signal lines 2 are used, but the number of the signal lines 2 is not limited to three. However, considering the needs to reduce the outer diameter, it is desirable to use three signal lines 2, because dead space is hardly created at the center when three wires are bundled. Three signal lines 2 with the same structure are used here.

As the insulator 22, it is desirable to use fluororesin in such a manner that the thickness of the insulator 22 can be reduced. As fluororesin to be used for the insulator 22 of the signal line 2, PFA (tetrafluoroethylene/perfluoroalkyl vinyl ether copolymer) can be used, for example, because a material with good transmission property is desirable.

The shield layer 23 is a lateral winding shield made by spirally wrapping multiple elementary wires 23*a* of copper alloy wires. As the elementary wires 23*a* used for the shield layer 23, as the inner conductor 21, it is desirable to use copper alloy wires with a tensile strength of 800 MPa or more. As copper alloy wires with a tensile strength of 800 MPa or more, copper alloy wires made of Cu—Sn—In alloy containing tin (Sn) and indium (In) and the balance being copper (Cu) and unavoidable impurities, Cu—In alloy containing indium (In) and the balance being copper (Cu) and unavoidable impurities, and Cu—Ag alloy containing silver (Ag) the balance being copper (Cu) and unavoidable impurities can be listed as examples.

Additionally, if a bending force or the like is repeatedly applied, the surfaces of other parts (for example, the insulator 22, an insulator 32 of the power lines 3, etc) are worn out by their rubbing against the elementary wires 23*a*, and the elementary wires 23*a* are worn out by the shield layers 23 rubbing against one another. To control these problems, it is desirable to use wires with smooth surfaces as the elementary wires 23*a* for the shield layer 23. Thus, tin-plated copper alloy wires are used here as the elementary wires 23*a*.

In the present embodiment, the outermost layer of the signal line 2 is the shield layer 23, but a jacket to cover around the shield layer 23 is omitted. With the omission, the outer diameter of the composite cable 1 can be reduced (in other words, it is easier to produce the composite cable 1 with the outer diameter of 1 mm or less). At the same time, when processing the terminal of the composite cable 1, the composite cable 1 can be connected to a connector by exposing multiple signal lines 2 from the end of the sheath 7 with the shield layer 23 as the outermost layer, and when the exposed multiple signal lines 2 are arranged in parallel on the connector, the inner conductors 21 can be arranged with a narrow pitch. It is desirable that the outer diameter of the signal line 2 is larger than the outer diameter of the power line 3 or the drain wire 4 that are described below. The outer diameter of the signal line 2 is, e.g., 0.3 mm or less. The outer diameter of the signal line 2 is 0.3 mm here. Also, the conductor size of the signal line 2 is 40 AWG.

(Power Line 3)

The power line 3 is an electrically insulated wire composed of the conductor 31, and the insulator 32 which covers around the conductor 31. The conductor 31 is a stranded conductor configured by concentrically twisting together multiple wires 31*a* composed of copper alloy wires. In the present embodiment, silver-plated copper alloy wires are used as the elementary wires 31*a* of the conductor 31 in order to reduce conductor resistance as much as possible. As the elementary wires 31*a* for the inner conductor 31, it is desirable to use copper alloy wires with a tensile strength of 800 MPa or more, in such a manner that the cable is not easily broken even when a bending operation or the like is repeatedly applied, as the inner conductor 21 and the shield layer 23 of the signal line 2 described above. As copper alloy wires with a tensile strength of 800 MPa or more, copper alloy wires made of Cu—Sn—In alloy containing tin (Sn) and indium (In) and the balance being copper (Cu) and unavoidable impurities, Cu—In alloy containing indium (In) and the balance being copper (Cu) and unavoidable impurities, and Cu—Ag alloy containing silver (Ag) and the balance being copper (Cu) and unavoidable impurities, can be listed as examples.

As the insulator 32, it is desirable to use fluororesin in such a manner that the thickness of the insulator 32 can be reduced. As fluororesin to be used for the insulator 32, it is desirable to use harder fluororesin than the fluororesin used for the insulator 22, e.g., ETFE (ethylene/tetrafluoroethylene copolymer) can be used. By using a material made from ETFE as the insulator 32, the insulator 32 is not worn out easily by rubbing against the shield layer 23 of the signal line 2 when a bending operation or the like is repeatedly applied to the composite cable 1, and thus, the cable is not easily broken.

The outer diameter of the power line 3 is smaller than the outer diameter of the signal line 2 and larger than the outer diameter of the drain wire 4. In more detail, the outer diameter of the power line 3 is 0.4 times or more and 0.5 times or less of the outer diameter of the signal line 2. With the outer diameter of the power line 3 in the above-mentioned range, a reduced outer diameter of the composite cable 1 and the composite cable 1 not easily broken when a bending operation or the like is repeatedly applied, can be achieved at the same time. In the present embodiment, the outer diameter of the power line 3 is 0.145 mm, or about 0.48 times of the outer diameter of the signal line 2. Also, the conductor size of the power line 3 is 42 AWG.

Two power lines 3 are used here, but the number of the power lines 3 is not limited to two. However, due to the structure of the cable core 5 explained later, the number of power lines 3 should be smaller than the number of the signal line 2. It is desirable the number of power lines 3 is smaller by one than the number of the signal lines 2. Multiple insulated wires stranded together can be used as one power line 3. In this case, a covering material to collectively cover around the multiple insulated wires can be arranged.

(Drain Wire 4)

The drain wire 4 is a stranded conductor made by concentrically twisting multiple elementary wires 4*a* of copper alloy wires. As the elementary wires 4*a* of the drain wire 4, as the inner conductor 21 and shield layer 23 of the signal line 2, and the conductor 31 of power line 3, it is desirable to use copper alloy wires with a tensile strength of 800 MPa or more. Also, the drain wire 4 in FIG. 1 is a stranded conductor made by concentric twisting, but it is not limited to this, it can be a stranded conductor made by collective twisting. As copper alloy wires with a tensile strength of 800 MPa or more, copper alloy wires made of Cu—Sn—In alloy containing tin (Sn) and indium (In) and the balance being copper (Cu) and unavoidable impurities, Cu—In alloy containing indium (In) and the balance being copper (Cu) and unavoidable impurities, and Cu—Ag alloy containing silver (Ag) and the balance being copper (Cu) and unavoidable impurities, can be listed as examples.

The outer diameter of the drain wire 4 is smaller than that of the signal line 2 and the power line 3. In more detail, the outer diameter of the drain wire 4 is 0.4 times or less of the outer diameter of the signal line 2. With the outer diameter of the drain wire 4 in the above-mentioned range, a reduced outer diameter of the composite cable 1, and the composite cable 1 not easily broken when a bending operation or the like is repeatedly applied, can be achieved at the same time. In the present embodiment, the outer diameter of the drain wire 4 is 0.09 mm, and 0.3 times of the outer diameter of the signal line 2.

(Cable Core 5)

The cable core 5 is composed of three signal lines 2, two power lines 3, and one drain wire 4 that are stranded together. In more detail, three signal lines 2 are arranged in contact with one another inside the cable core 5. The two power lines 3 and the drain wire 4 are respectively arranged in three valley-like spaces 9 located between the signal lines 2 arranged side by side in a radial direction of the cable, but more outer side in a radial direction of the cable than the areas where the signal lines 2 are in contact with one another. "Three signal lines 2 are arranged in contact with one another" here means that the three signal lines 2 are stranded or bundled, and the shield layers 23 which are the outermost layers of the three signal lines 2 are in contact with one another. In the present embodiment, the three signal lines 2 are stranded and arranged at the center of the cable in such a manner that they are in contact with one another inside the cable core 5.

In the present embodiment, the outer diameter of the drain wire 4 is smaller than the outer diameter of the signal line 2 and the power line 3 (0.4 times or less of the outer diameter of the signal line 2). Therefore, as shown in FIG. 1, a clearance (gap) 8 is created around the drain wire 4 to allow the drain wire 4 to move under the binder tape 6 in a radial direction of the cable (in other words, in order to move the drain wire 4 in a radial direction of the cable) in the composite cable 1. Also, no filler is arranged in the clearance 8. With this, it can prevent the drain wire 4 from easily breaking when a bending operation is repeatedly applied to the composite cable 1 and the drain wire 4 and the shield layers 23 of the signal lines 2 are rubbed against one another. Although the clearance 8 exists, the influence of gravity or the like surely makes the drain wire 4 contact the shield layers 23 of the signal lines 2 in any location in a longitudinal direction of the cable and is electrically connected, because the entire cable core 5 is stranded.

Also, it is desirable that the wrapping direction of multiple elementary wires 23*a* that constitute the shield layer 23 as a lateral winding shield, the twisting direction of the multiple elementary wires 4*a* that constitute the drain wire 4, and a twisting direction of the cable core 5 (in other words, a direction where the signal line 2, the power line 3, and the drain wire 4 are twisted together) are in the same direction. By doing so, the shield layer 23, the drain wire 4, and the cable core 5 are loosened or tightened in synchronization, when a bending operation or the like is repeatedly applied to the composite cable 1. That can prevent an excessive load from applying on each of the signal line 2, the power line 3, and the drain wire 4, and at the same time, prevent them from rubbing one another in contact. Therefore, the composite cable 1 is not easily broken when a bending operation or the like is repeatedly applied. Additionally, the wrapping direction of the shield layer 23 is a direction where the elementary wires 23*a* are rotating from one end to another, seeing from one end in a longitudinal direction of the composite cable 1. The twisting direction of the drain wire 4, seeing from one end in a longitudinal direction of the drain wire 4 (one end in longitudinal direction of the composite cable 1) is a direction where the elementary wires 4*a* are rotating from one end to another. The twisting direction of the cable core 5, seeing from one end in a longitudinal direction of the composite cable 1, the signal line 2, the power line 3, and the drain wire 4 are rotating from one end to another.

(Binder Tape 6)

The binder tape 6 is made of a tape spirally wrapped around the cable core 5, and plays a role in maintaining the twisted form of the cable core 5. As the binder tape 6, a tape made of non-woven cloth, paper, or resin and the like can be used. As shown in FIG. 1, the binder tape 6 is wrapped spirally in contact with each of the signal lines 2 and the power lines 3 that constitute the cable core 5 in a section perpendicular to a longitudinal direction of the composite cable 1. It is desirable that the wrapping direction of the binder tape 6 is the same as the twisting direction of the cable core 5. By doing so, the composite cable 1 is not easily broken when a bending operation or the like is repeatedly applied.

(Sheath 7)

The sheath 7 is arranged to cover around the binder tape 6, in order to protect the cable core 5. As the sheath 7, it is desirable to use fluororesin in such a manner that the thickness of the sheath 7 can be reduced. Also, a shield layer to collectively cover around the cable core 5 is omitted in the composite cable 1 in order to make the cable diameter thinner. In other words, in the composite cable 1, by extruding resin made of fluororesin into a tube on the surface of the binder tape 6, the sheath 7 is arranged with the inner surface of the sheath 7 in contact with the surface of the binder tape 6. The outer diameter of the sheath 7, in other words, the outer diameter of the composite cable 1 is 1.0 mm or less. Here, the outer diameter of the composite cable 1 is about 0.9 mm.

(Wiring of the Composite Cable 1)

Figure 2:
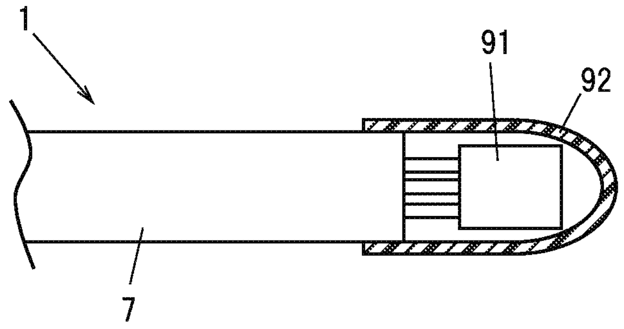
FIG. 2 shows a terminal portion of the composite cable for wiring.

The composite cable 1 has a very thin outer diameter of 1.0 mm or less, so after wiring the cable in an industrial robot or the like, it is difficult to connect a connected member such as a connector or a sensor module to a terminal of the composite cable 1 in some cases. Also, after wiring the composite cable 1 in an industrial robot or the like, when connecting a connector or a sensor module to a terminal of the wired composite cable 1, it is difficult to process the terminal of the wired composite cable 1 or to connect to a connected member. Therefore, when wiring the composite cable 1 in an industrial robot or the like, as shown in FIG. 2, it is desirable to connect a connected member 91 to the terminal of the composite cable 1 in advance, and then wire the composite cable 1 with the connected member 91 connected.

In this case, to avoid damaging the connected member 91 by impacting or touching other members around a wiring path, it is more desirable to cover the terminals of the connected member 91 and the composite cable 1 with a protective cover material 92, and then wire the connected member 91 and the composite cable 1 covered with a protective cover material 92. As the cover material 92, resin such as rubber or the like can be used. The cover material 92 is in a bag-like shape (dome shape or cap shape) with an opening to insert the terminals of the connected member 91 and the composite cable 1. However, the shape of the cover material 92 is not limited to the above.

Functions and Effects of the Embodiment

As explained above, in the composite cable 1 according to the present embodiment, the outermost layer of the signal line 2 is the shield layer 23, either one of the power line 3 or the drain wire 4 is arranged in each valley-like space 9 between the multiple signal lines 2 arranged in contact with one another inside the cable core 5, the outer diameter of the drain wire 4 is smaller than the outer diameter of the signal line 2 and the power line 3, and the clearance 8 is created between the drain wire 4 and the binder tape 6 in such a manner that the drain wire 4 can move in a radial direction of the cable.

Omitting the jacket of the signal line 2 enables reducing the diameter of the composite cable 1, but the outermost layer of the signal line 2 is the shield layer 23, so the drain wire 4 may be easily broken by rubbing against the shield layer 23. In the present embodiment, the outer diameter of the drain wire 4 is intentionally made smaller than the outer diameters of the signal line 2 and power line 3, and the structure is created in such a manner that the drain wire 4 can move into the valley-like space 9 between the signal lines 2 arranged side by side, leaving the gap 8 around the drain wire 4, and thus, the drain wire 4 is not easily broken by being rubbed against the shield layer 23. As a result, for example, an extremely thin composite cable 1 with the outer diameter of 1.0 mm or less can be realized, which is not easily broken even when a bending operation is repeatedly applied in a small bending radius of five times or less of the outer diameter of the composite cable 1.

Omitting the jacket of the signal line 2 enables arranging the signal lines 2 in parallel with a smaller gap between them when processing the terminal of the composite cable 1, and facilitates connecting connected members such as a connector with a narrow pitch. Also, the composite cable 1 can do with a shorter exposure length of the cable core 5 (length of the cable core 5 exposed from the end of the sheath 7), which leads to downsizing of the connected member 91 such as a connector connected to the terminal of the composite cable 1.

Summary of the Embodiment

Next, technical ideas understood from the above embodiment, are described with reference to the reference numerals and the like used in the embodiment. However, each reference numeral in the following description does not limit the constituent elements in the scope of claims to the members and the like specifically shown in the embodiment.

According to the first feature, a composite cable 1, with an outer diameter of 1.0 mm or less, includes a cable core 5 including multiple signal lines 2, a power line 3 with an outer diameter smaller than an outer diameter of the signal line 2, and a drain wire 4 with an outer diameter smaller than the outer diameter of the power line 3;

a binder tape 6 wrapped around the cable core 5; and a sheath 7 covering around the binder tape 6, wherein an outermost layer of the signal line 2 is a shield layer 23, and either one of the power line 3 or the drain wire 4 is arranged in each valley-like space 9 between the multiple signal lines 2 arranged in contact with one another inside the cable core 5.

According to the second feature, in the composite cable 1 as described in the first feature, there is a gap 8 between the drain wire 4 and the binder tape 6 in such a manner that the drain wire 4 is movable in a radial direction of the cable.

According to the third feature, in the composite cable 1 as described in the first feature, the outer diameter of the drain wire 4 is 0.4 times or less of the outer diameter of the signal line 2.

According to the fourth feature, in the composite cable 1 as described in the first feature, the outer diameter of the power line 3 is 0.4 times or more and 0.5 times or less of the outer diameter of the signal line 2

According to the fifth feature, in the composite cable 1 as described in the first feature, each of an inner conductor 21 of the signal line 2, a conductor 31 of the power line 3, and the drain wire 4 is configured by twisting elementary wires 21*a*, 31*a*, 4*a*, each composed of a copper alloy wire having a tensile strength of 800 MPa or more, and wherein the shield layer 23 is a lateral winding shield made by spirally wrapping elementary wires 23*a*, each composed of a copper alloy wire having a tensile strength of 800 MPa or more.

According to the sixth feature, in the composite cable 1 as described in the fifth feature, a winding direction of the lateral winding shield, a twisting direction of the drain wire 4, and a twisting direction of the cable core 5 are a same direction.

According to the seventh feature, in the composite cable 1 as described in the first feature, the cable core 5 has three signal lines 2, two power lines 3, and one drain wire 4.

According to the eighth feature, in the composite cable 1 as described in the first feature, wherein the cable core 5 has the multiple signal lines 2 for signal transmission, the multiple power lines 3 for power supply, and the drain wire 4 for grounding.

Supplementary Note

That is all for the description of the embodiment of the present invention. The embodiment described above does not limit the invention according to the scope of claims. Also, it should be noted that not all combinations of features are essential to the means for solving problems of the invention. Additionally, this invention is not limited to the above embodiment, but various modifications can be made without departing from the scope and spirit of the invention.

The invention claimed is:

1. A composite cable, with an outer diameter of 1.0 mm or less, comprising:

a cable core comprising multiple signal lines, a power line with an outer diameter smaller than an outer diameter of the signal line, and a drain wire with an outer diameter smaller than the outer diameter of the power line; and a sheath covering around the cable core, wherein an outermost layer of the signal line is a shield layer, and wherein the power line and the drain wire are arranged in a valley-like space between the multiple signal lines arranged in contact with one another inside the cable core.

2. The composite cable according to claim 1, wherein there is a gap between the drain wire and a binder tape wrapped around the cable core in such a manner that the drain wire is movable in a radial direction.

3. The composite cable according to claim 1, wherein the outer diameter of the drain wire is 0.4 times or less the outer diameter of the signal line.

4. The composite cable according to claim 1, wherein the outer diameter of the power line is 0.4 times or more and 0.5 times or less the outer diameter of the signal line.

5. The composite cable according to claim 1, wherein each of an inner conductor of the signal line, a conductor of the power line, and the drain wire is configured by twisting elementary wires, each composed of a copper alloy wire having a tensile strength of 800 MPa or more, and wherein the shield layer is a lateral winding shield made by spirally wrapping elementary wires, each composed of a copper alloy wire having a tensile strength of 800 MPa or more.

6. The composite cable according to claim 1, wherein a winding direction of the lateral winding shield, a twisting direction of the drain wire, and a twisting direction of the cable core are a same direction.

7. The composite cable according to claim 1, wherein the cable core has three signal lines, two power lines, and one drain wire.

8. The composite cable according to claim 1, wherein the cable core has the multiple signal lines for signal transmission, multiple power lines for power supply, and the drain wire for grounding.

9. The composite cable according to claim 1, wherein the drain wire is a stranded conductor composed of multiple copper alloy wires twisted together.

10. The composite cable according to claim 9, wherein the stranded conductor is not covered with an insulator.

11. The composite cable according to claim 1, wherein the drain wire is used for grounding.

12. The composite cable according to claim 1, wherein the signal lines are arranged at a center of the cable core and stranded together such that the shield layers of the multiple signal lines are in direct contact with one another.

13. The composite cable according to claim 1, wherein the sheath is formed of a fluororesin extruded into a tube directly contacting an outer surface of a binder tape wrapped around the cable core, and wherein no additional shield layer is provided between the binder tape and the sheath.

14. The composite cable according to claim 1, wherein the signal line comprises an inner conductor covered by an insulator formed of a fluororesin, and the power line comprises a conductor covered by an insulator formed of a fluororesin harder than the fluororesin of the signal line insulator.

15. The composite cable according to claim 1, wherein the binder tape is spirally wrapped around the cable core in a wrapping direction that is the same as a twisting direction of the cable core.

16. The composite cable according to claim 1, wherein the signal line has a conductor size of 40 American Wire Gauge (AWG), and wherein the power line has a conductor size of 42 AWG.

17. The composite cable according to claim 1, wherein no filler material is arranged in the valley-like spaces between the multiple signal lines.

18. The composite cable according to claim 1, further comprising a connected member attached to a terminal of the composite cable, wherein the connected member and the terminal are covered by a protective cover material.

19. The composite cable according to claim 1, wherein the shield layer of the signal line is composed of tin-plated copper alloy wires to reduce wear on adjacent components during repeated bending.

20. A composite cable, with an outer diameter of 1.0 mm or less, comprising:

a cable core comprising multiple signal lines, a power line with an outer diameter smaller than an outer diameter of the signal line, and a drain wire with an outer diameter smaller than the outer diameter of the power line; and a sheath covering around the cable core, wherein an outermost layer of the signal line is a shield layer, wherein the power line is arranged in a first valley-like space between the multiple signal lines arranged in contact with one another inside the cable core, wherein the drain wire is arranged in a second valley-like space between the multiple signal lines arranged in contact with one another inside the cable core, and wherein there is a gap between the drain wire and a binder tape wrapped around the cable core in such a manner that the drain wire is movable in a radial direction.

* * * * *